3,541,207
THERAPEUTIC AGENTS FOR CONTROLLING UNWANTED AQUATIC PROTOZOAL LIFE AND METHOD OF USE
Edward L. Sharpe, Berea, Ohio, assignor to Douglass R. Falkenberg, Rocky River, Ohio
No Drawing. Filed Mar. 24, 1967, Ser. No. 625,617
Int. Cl. A01k 63/00; A61k 27/00
U.S. Cl. 424—127      3 Claims

ABSTRACT OF THE DISCLOSURE

This invention is in a composition of matter prepared by heating a dilute solution of formaldehyde with an alkali metal bicarbonate at ordinary pressure until the volume of the solution has been reduced by from about 65% to 85%, to yield an alkaline reacting solution or gel. This product, whether in solution form or as a gel, when administered to an aquarium at the rate from .1 cc. to about 2.5 cc. per 10 gals. of water, provides a therapeutic agent which is amazingly effective in the treatment of common fish disorders.

---

Aquatic animal life in captivity, it is known, are frequently subject to diseases of various kinds, and particularly to attack by protozoan life producing a condition which is known as "ich." If allowed to persist, this condition worsens, and a single specimen infected therewith is capable of infecting an entire aquarium. If unchecked, this disease is usually fatal.

The growth of interest in keeping both fresh water and salt water fish on display in the home, for example, has given rise to a considerable increase in the maintenance of commercial aquariums stocked with relatively large numbers of various species of fish for both display and sales purposes. Also, it has resulted in a large increase in the number of breeding tanks for the growth of species for sales purposes. Still further, there has been a general increase in the interest in public displays of aquatic animal life in publicly maintained aquariums. The maintenance of such aquariums and the necessity for keeping them free of predatory diseases, such as the one mentioned above, has become, therefore, increasingly important.

It has now been found that a remarkably effective therapeutic agent for aquatic animal life can be produced by heating an alkali metal bicarbonate, such as sodium bicarbonate, potassium bicarbonate, or lithium bicarbonate, with a formaldehyde solution, the latter containing formaldehyde in relatively large excess on a stoichiometric basis, and in the range of from about 2 moles of formaldehyde to 1 mole of the alkali metal bicarbonate, up to as much as from 12 moles of formaldehyde to 1 of the bicarbonate and, preferably, in a ratio of from about 7.5 moles of formaldehyde as an aqueous solution, to 1 of the bicarbonate.

The production of this therapeutic agent is exceedingly simple, involving only the boiling together of these reactant materials until the aqueous solution has been reduced in volume and free formaldehyde ceases to be distilled over. However, the product which results from this simple operation is exceedingly difficult to analyze, having so far defied accurate analysis. Accordingly, it is possible only to describe the material in the light of present knowledge thereof with respect to the process by which it is produced.

As indicated above, depending upon the extent of the evaporation of the fluid components, the resultant product may be either a solution or it may solidify on cooling to room temperature into a white pastry gel-like substance. In either form, the material has been found to be extraordinarily effective in the control of diseases to which aquatic animal life is normally subject, for example "ich."

Best results have been secured with the product which is produced by reacting U.S.P. grade Formalin (37% formaldehyde) containing 9–12% methanol with potassium bicarbonate in a mole ratio of approximately 7.5 to 1 of formaldehyde to potassium bicarbonate. To produce this product in a small quantity, for example, 125 ml. of U.S.P. grade, preferably fresh, formaldehyde solution (37%), 125 ml. of distilled water, preferably at a temperature of from 70° F. to 90° F. and 14 grams of potassium bicarbonate, are heated together in a glass flask fitted with a side-arm vent leading to a water-cooled condenser, without substantial reflux of the distillate, into the reaction mass. The heating should begin promptly after the ingredients are mixed. The volume of the reaction mass is reduced to about 110 ml. This product is allowed to cool at this point. It is alkaline reacting, i.e. in aqueous solution it shows a pH above 7.

The product is entirely useful in this form by the simple addition of from about .5 to about 2 cc. of the solution to 20 gallons of salt water, or from about .5 to 1.5 cc. to about 5 gallons of fresh water. Fish infected with protozoan-type diseases such as "ich" will respond to treatment with this material within about 24 hours, showing decided improvement and remission of the disease symptoms. The potassium bicarbonate product does not easily form a gel as does the sodium derivative. The larger dosages are more readily accepted by larger fish. In some instances, it is desirable to mix the product with from about 0.5 to about 2.0 volumes of an isotonic saline solution, or a 5% dextrose solution of the type normally used for intravenous treatment of human beings. When so diluted, the product of this invention does not congeal and remains as a stable aqueous solution. A dextrose-containing solution at 1:1 dilution ratio is extremely beneficial since it also provides a readily acceptable food material for fish which, prior to treatment, have generally refused to feed. The concentration of the therapeutic agent in such diluted solutions is maintained at the same level as with the undiluted material. Not only do fish treated with these compositions rapidly recover from the disease, but it has also been observed that the colors are considerably enhanced following treatment, and the liveliness of the fish, or "vitality," seems to be substantially improved.

While the potassium derivative is preferred, the sodium derivative has also been successfully produced and utilized in the treatment of aquatic animal life. It is produced in a manner identical to that utilized in producing the potassium derivatives except that the reduction in volume is to a greater extent, i.e., from about 75% to about 95% reduction in volume, the mole ratio being essentially the same and the manner of producing the reaction product being the same. Also, when this product is diluted before cooling, the sodium derivative forms a stable solution which apparently has good shelf life. It is soluble in saline or salt-free aqueous media. It should also be noted that if the reduction in volume of the original reaction mass is held to from 45% to 60% of the original volume, then a stable aqueous solution which will not gel and which is equally useful is obtained providing the pH is above 7.

It is essential, with respect to these alkali metal bicarbonate derivatives, that the final product show an alkaline reaction in aqueous solution. The diluted product produced in accordance with the foregoing examples should have a pH above 7 and, preferably, in the range of 7.5 to 9.5. If the material is on the acid side, it will be found to be quickly fatal to more delicate species.

The chemical structure of the product which is produced by this reaction is not known. Alkali metal formate has been detected in these compositions, but when fish are exposed to aqueous solutions of sodium formate alone, no noticeable effect is observed. It was thought that a polyformaldehyde, such as paraformaldehyde, was produced by this reaction. However, treatment of healthy fish with a solution of paraformaldehyde in approximately the determined concentration resulted in death overnight for the species treated. Without in any way intending to be limited by the theory, it is suggested that there is formed a sodium end blocked polymer of formaldehyde of undetermined length (possibly from 4 to 8 units) which, in the presence of the diseased areas, undergoes controlled depolymerization with the release of minute amounts of free formaldehyde which have a therapeutic effect at the concentration level, and which concentration level is well below the level for toxicity.

A problem with guppies is what is known as "split fins." To control this problem in the raising of guppies, it has been found that 1 cc. of the dextrose diluted solution, produced in accordance with the above and based on the potassium bicarbonate reaction product, in 5 gallons of fresh water, repeated once five days later, gave remarkable results. After the second treatment, the fish were observed to be lively and the colors greatly improved. Young fry in the tank were not adversely affected by the treatment. The disease stopped spreading immediately after the first treatment.

The effectiveness of this composition does not appear to be limited to the small fish ranging in size from about .5" to about 4" in length, and aquatic animal life of considerable size, i.e., up to seven feet in length, has been found advantageously treated by this material. Treatment of aquariums containing as much as 500 to 1000 gallons, i.e., commercial aquariums or public display aquariums, has also proved beneficial.

Attempts to obtain similar results utilizing alkali metal hydroxides and alkali metal carbonates have proved worthless, and death to the species treated with the product resulting when these basic materials are substituted for the bicarbonate has invariably occurred. Thus, the present invention is limited to alkali metal bicarbonates for treatment of aqueous formaldehyde solutions. In accordance with present procedures, it is desirable to produce these products in small batches, the maximum preferred volume of reaction mass for the sodium derivative being about 500 ml., and for the potassium salt being about 1500 ml.

There has thus been provided a highly effective therapeutic agent for aquatic animal life (especially tropical fish) which is capable of controlling, and apparently curing, common diseases of such life, such as "ich," "split fin," "shimmies," and the like. After treatment, the fish appear to regain vitality, the symptoms of the disease disappear, and the fish feed extremely well. The presence of the material in tanks containing undiseased species shows no ill effects upon such species thereby demonstrating tolerance by undiseased fish. Dosage may be repeated at the levels indicated above over periods ranging from 24 hours to as much as 170 hours. The agent may be used as a preventive material to inhibit the development of diseases of the types mentioned above. In general, the composition is a reaction product of sodium, potassium, or lithium bicarbonates and formaldehyde in a mole ratio of from 1:2 to 1:12, and especially in the range of from 1:6 to 1:8, formed by boiling an aqueous solution of formaldehyde and an alkali metal bicarbonate until the volume of the reaction mass has been reduced by distillation in the absence of reflux to a residue of from 5% to 55% of the original volume. The resultant product must have a pH above 7 and, preferably, in the range of from 7.5 to 9.5.

What is claimed is:

1. A therapeutic agent for controlling unwanted aquatic protozoal life comprising the product prepared by boiling an aqueous solution of an alkali metal bicarbonate selected from the group consisting of sodium, potassium and lithium bicarbonate and formaldehyde in a mole ratio in the range of from 1 to about 2 to 12, respectively, until the volume of the heated mixture has been reduced to 5 to 55 percent of its original volume.

2. A stabilized composition for controlling unwanted aquatic protozoal life comprising the product of claim 1 diluted with an aqueous solution selected from the group consisting of isotonic saline and 5% dextrose.

3. The method of controlling unwanted protozoan type diseases in fish which comprises treating said fish with an antiprotozoal amount of the composition of claim 2.

References Cited

Merck Veterinary Manual, pp. 1410–11 and 1565, 1961.

ALBERT T. MEYERS, Primary Examiner

H. M. ELLIS, Assistant Examiner

U.S. Cl. X.R.

424—176, 334